US011196523B2

(12) United States Patent
Liu et al.

(10) Patent No.: US 11,196,523 B2
(45) Date of Patent: Dec. 7, 2021

(54) SRS RESOURCE CONFIGURATION ENHANCEMENTS

(71) Applicant: QUALCOMM Incorporated, San Diego, CA (US)

(72) Inventors: Le Liu, Fremont, CA (US); Alberto Rico Alvarino, San Diego, CA (US); Alexandros Manolakos, San Diego, CA (US); Wanshi Chen, San Diego, CA (US); Ayan Sengupta, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/514,744

(22) Filed: Jul. 17, 2019

(65) Prior Publication Data

US 2020/0028638 A1 Jan. 23, 2020

(30) Foreign Application Priority Data

Jul. 20, 2018 (GR) ............................. 20180100333
May 3, 2019 (GR) ............................. 20190100195

(51) Int. Cl.
*H04L 5/00* (2006.01)
*H04B 1/713* (2011.01)

(52) U.S. Cl.
CPC ............. *H04L 5/005* (2013.01); *H04B 1/713* (2013.01); *H04B 2201/698* (2013.01)

(58) Field of Classification Search
CPC ... H04B 1/713; H04B 2201/698; H04L 5/005; H04L 25/0226; H04W 52/10; H04W 52/146; H04W 52/325; H04W 72/0413
See application file for complete search history.

(56) References Cited

U.S. PATENT DOCUMENTS

| 9,713,096 | B2 * | 7/2017 | Lee ....................... H04W 52/54 |
| 9,730,204 | B2 * | 8/2017 | Yi ...................... H04W 28/0268 |
| 10,439,847 | B2 * | 10/2019 | Park ..................... H04W 52/32 |
| 10,516,517 | B2 * | 12/2019 | Xiong ................... H04L 5/0053 |
| 10,602,525 | B2 * | 3/2020 | Kumar .................. H04L 1/1887 |
| 10,749,637 | B2 * | 8/2020 | Cheng ................. H04L 27/0014 |

(Continued)

FOREIGN PATENT DOCUMENTS

WO  WO-2016122782 A1 * 8/2016 ........... H04L 5/0053

OTHER PUBLICATIONS

3GPP, Technical Specification 38.211, NR, Physical Channels and Modulation, Jun. 2018, 3GPP, Release 15, Version 15.2.0 (Year: 2018).*

(Continued)

*Primary Examiner* — Eric Nowlin
(74) *Attorney, Agent, or Firm* — Changwoo Yang

(57) ABSTRACT

Certain aspects of the present disclosure provide techniques for sounding reference signal (SRS) resource configuration enhancements. A method generally includes receiving, from the network, a message comprising sounding reference signal (SRS) configuration information, wherein the SRS configuration information comprises configuration information for a first SRS resource set and configuration information for a second SRS resource set and transmitting at least one SRS according to the received SRS configuration information.

28 Claims, 13 Drawing Sheets

(56) References Cited

U.S. PATENT DOCUMENTS

| | | | | |
|---|---|---|---|---|
| 2012/0069812 | A1* | 3/2012 | Noh | H04L 5/0091 370/329 |
| 2014/0023004 | A1* | 1/2014 | Kumar | H04L 1/0026 370/329 |
| 2014/0036809 | A1* | 2/2014 | Xu | H04W 52/325 370/329 |
| 2015/0296490 | A1* | 10/2015 | Yi | H04W 52/281 370/329 |
| 2016/0226639 | A1* | 8/2016 | Xiong | H04L 1/08 |
| 2018/0123850 | A1* | 5/2018 | Zarifi | H04J 13/0062 |
| 2018/0176924 | A1* | 6/2018 | Kumar | H04L 1/0027 |
| 2018/0213530 | A1* | 7/2018 | Mochizuki | H04W 72/0446 |
| 2019/0044598 | A1* | 2/2019 | Talarico | H04L 27/0006 |
| 2019/0174466 | A1* | 6/2019 | Zhang | H04L 5/005 |
| 2019/0199554 | A1* | 6/2019 | Park | H04W 72/12 |
| 2019/0215217 | A1* | 7/2019 | Kim | H04W 72/0466 |
| 2019/0222361 | A1* | 7/2019 | Cheng | H04L 27/0014 |
| 2019/0281588 | A1* | 9/2019 | Zhang | H04W 52/08 |
| 2019/0363911 | A1* | 11/2019 | Choi | H04L 5/0091 |
| 2019/0372806 | A1* | 12/2019 | Park | H04W 80/02 |
| 2020/0036556 | A1* | 1/2020 | Wei | H04L 5/0094 |
| 2020/0106646 | A1* | 4/2020 | Liu | H04L 5/0048 |
| 2020/0127698 | A1* | 4/2020 | Cho | H04B 1/44 |
| 2020/0252241 | A1* | 8/2020 | Park | H04W 72/042 |
| 2020/0322187 | A1* | 10/2020 | He | H04L 5/0055 |

OTHER PUBLICATIONS

CATT, Remaining Issues on SRS, May 21, 2018, 3GPP, 3GPP TSG RAN WG1 Meeting #93, Tdoc: R1-1806286 (Year: 2018).*

International Search Report and Written Opinion—PCT/US2019/042431—ISA/EPO—dated Feb. 24, 2020.

Qualcomm Incorporated: "Remaining Details on SRS", 3GPP Draft; 3GPP TSG RAN WG1 Meeting 90bis, RI-1718549, 3rd Generation Partnership Project (3GPP), Mobile Competence Centre; 650, Route Des Lucioies; F-06921 Sophia-Antipolis Cedex; France, vol. RAN WG1, No. Prague, CZ; Oct. 9, 2017-Oct. 13, 2017, Oct. 8, 2017 (Oct. 8, 2017), 9 Pages, XP051341730, Retrieved from the Internet: URL: http://www.3gpp.org/ftp/Meetings_3GPP_SYNC/RAN1/Docs/ [retrieved on Oct. 8, 2017], p. 1-p. 5.

Sony: "Summary of SRS", 3GPP Draft, 3GPP TSG RAN WG1 Meeting #92-Bis, R1-1805678—Summary of SRS V0.4, 3rd Generation Partnership Project (3GPP), Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 19, 2018 (Apr. 19, 2018), 49 pages, XP051427804, Retrieved from the Internet: URL: http://www.3gpp.org/ftp/Meetings%5F3GPP%5FSYNC/RAN1/Docs/ [retrieved on Apr. 19, 2018], p. 25-p. 27.

Dahlman E., et al., "Uplink Physical-layer Processing," In: "4g, LTE Evolution and the Road to 5G", Jan. 1, 2016, Elsevier, XP055627388, ISBN: 978-0-12-804575-6 pp. 169-225, DOI: 10.1016/B978-0-12-804575-6.00007-8, p. 185-p. 189.

OPPO: "Remaining Issues on SRS Design", 3GPP Draft; R1-1806828, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 11, 2018, XP051461980, 3 pages, Retrieved from the Internet: URL: http://www.3gpp.org/ftp/tsg%5Fran/WG1%5FRL1/TSGR1%5F93/Docs [retrieved on May 11, 2018] p. 1-p. 3.

Partial International Search Report—PCT/US2019/042431—ISA/EPO—dated Nov. 8, 2019.

Qualcomm Incorporated: "Maintenance for SRS", 3GPP Draft; R1-1807349 Draft, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 20, 2018, XP051442541, 6 Pages, Retrieved from the Internet: URL: http://www.3gpp.org/ftp/Meetings%5F3GPP%5FSYNC/RAN1/Docs/ [retrieved on May 20, 2018] p. 1-p. 4.

* cited by examiner

SRS RESOURCE CONFIGURATION ENHANCEMENTS

CROSS-REFERENCE TO RELATED APPLICATIONS

This application claims priority to Greece Patent Application Nos. 20180100333 and 20190100195, filed Jul. 20, 2018 and May 3, 2019, respectively, which are assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for sounding reference signal (SRS) resource configuration enhancements.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications in a network by a user equipment (UE). The method generally includes receiving, from the network, a message comprising sounding reference signal (SRS) configuration information, wherein the SRS configuration information comprises configuration information for a first SRS resource set and configuration information for a second SRS resource set, and transmitting at least one SRS according to the received SRS configuration information.

Certain aspects provide an apparatus for wireless communications in a network by a user equipment (UE). The apparatus generally includes at least one processor configured to receive, from the network, a message comprising sounding reference signal (SRS) configuration information, wherein the SRS configuration information comprises configuration information for a first SRS resource set and configuration information for a second SRS resource set, and transmit at least one SRS according to the received SRS configuration information. The apparatus also generally includes a memory coupled with the at least one processor.

Certain aspects provide an apparatus for wireless communications in a network by a user equipment (UE). The apparatus generally includes means for receiving, from the network, a message comprising sounding reference signal (SRS) configuration information, wherein the SRS configuration information comprises configuration information for a first SRS resource set and configuration information for a second SRS resource set, and means for transmitting at least one SRS according to the received SRS configuration information.

Certain aspects provide a non-transitory computer-readable medium for wireless communications in a network by a user equipment (UE). The non-transitory computer-readable medium generally includes instructions that, when executed by at least one processor, configure the at least one processor to receive, from the network, a message comprising sounding reference signal (SRS) configuration information, wherein the SRS configuration information comprises configuration information for a first SRS resource set and configuration information for a second SRS resource set, and transmit at least one SRS according to the received SRS configuration information.

Certain aspects provide a method for wireless communications in a network by a user equipment (UE). The method generally includes determining sounding reference signal (SRS) configuration information, wherein the SRS configuration information comprises configuration information for a first SRS resource set and configuration information for a second SRS resource set, transmitting the SRS configuration information to one or more user equipments, and receiving at least one SRS based on the SRS configuration information.

Certain aspects provide an apparatus for wireless communications in a network by a user equipment (UE). The apparatus generally includes at least one processor configured to determine sounding reference signal (SRS) configuration information, wherein the SRS configuration information comprises configuration information for a first SRS resource set and configuration information for a second SRS resource set, transmit the SRS configuration information to one or more user equipments, and receive at least one SRS based on the SRS configuration information. The apparatus also generally includes a memory coupled with the at least one processor Certain aspects provide an apparatus for wireless communications in a network by a user equipment (UE). The apparatus generally includes means for determining sounding reference signal (SRS) configuration information, wherein the SRS configuration information comprises configuration information for a first SRS resource set and configuration information for a second SRS resource set, means for transmitting the SRS configuration information to one or more user equipments, and means for receiving at least one SRS based on the SRS configuration information.

Certain aspects provide a non-transitory computer-readable medium for wireless communications in a network by a user equipment (UE). The non-transitory computer-readable medium generally includes instructions that, when executed by at least one processor, configure the at least one processor to determine sounding reference signal (SRS) configuration information, wherein the SRS configuration information comprises configuration information for a first SRS resource set and configuration information for a second SRS resource set, transmit the SRS configuration information to one or more user equipments, and receive at least one SRS based on the SRS configuration information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
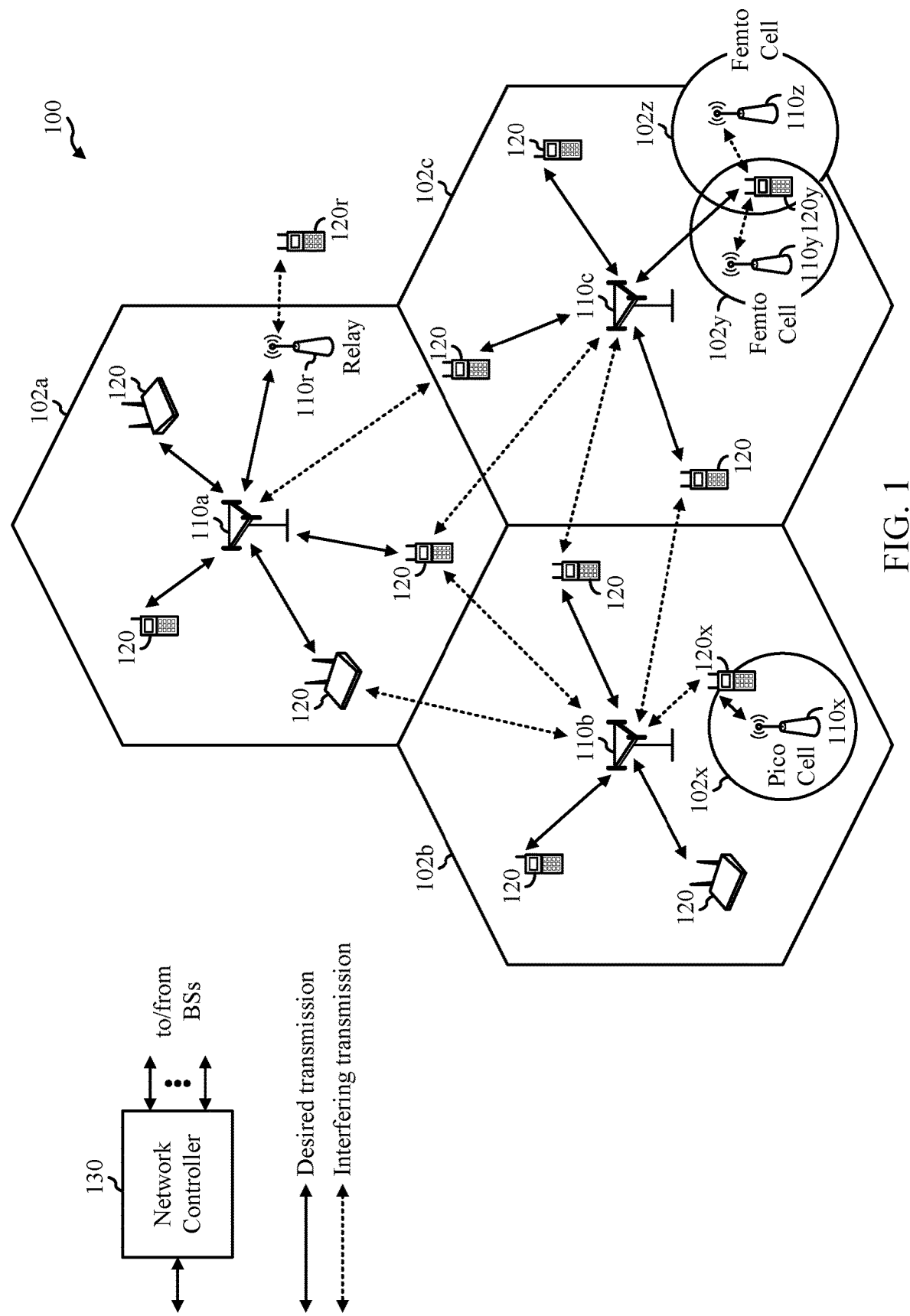
FIG. 1 is a block diagram conceptually illustrating an example telecommunications system, in accordance with certain aspects of the present disclosure.

Aspects of the present disclosure provide apparatus, methods, processing systems, and computer readable mediums for sounding reference signal (SRS) resource configuration enhancements.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100.

For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
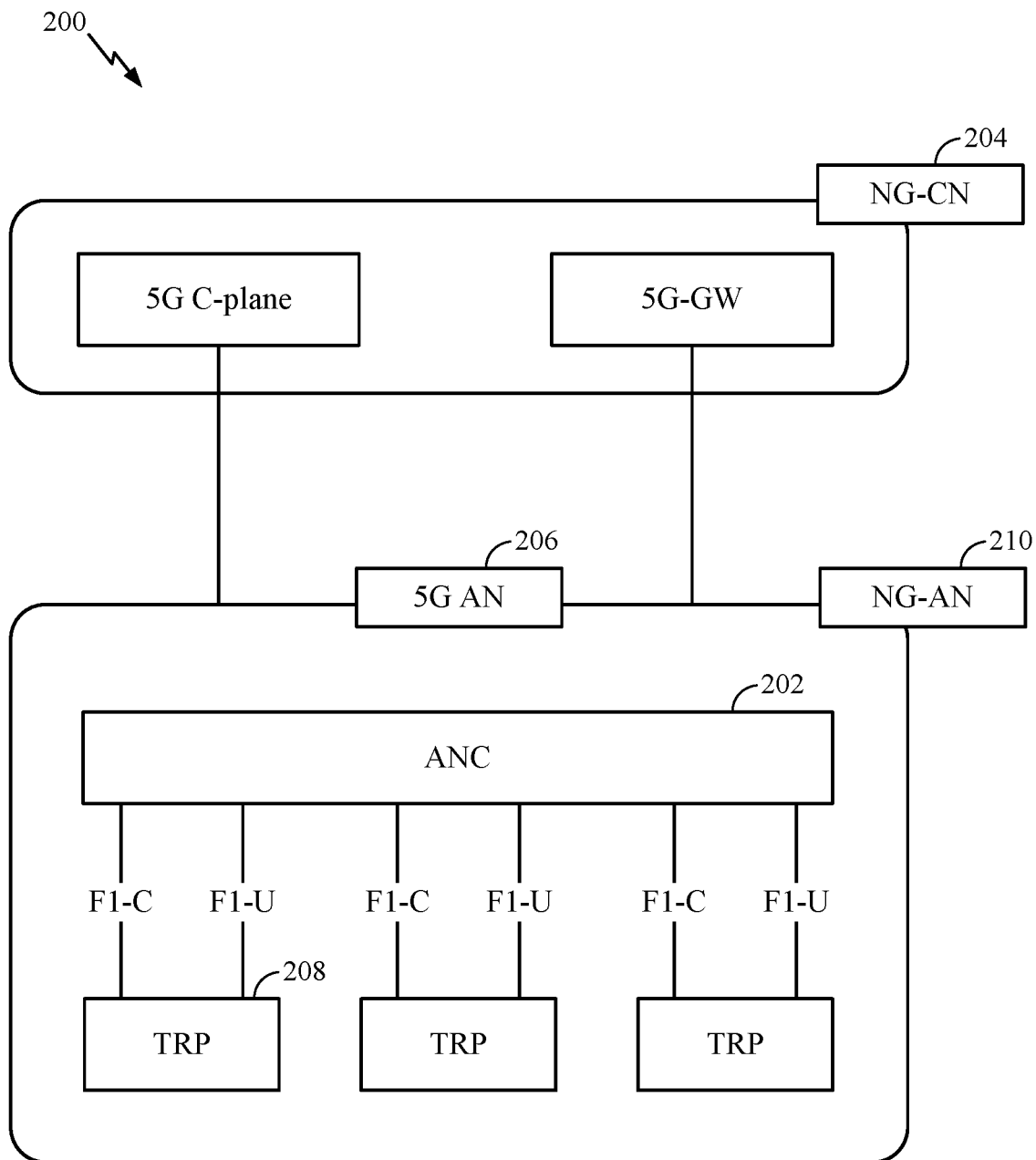
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
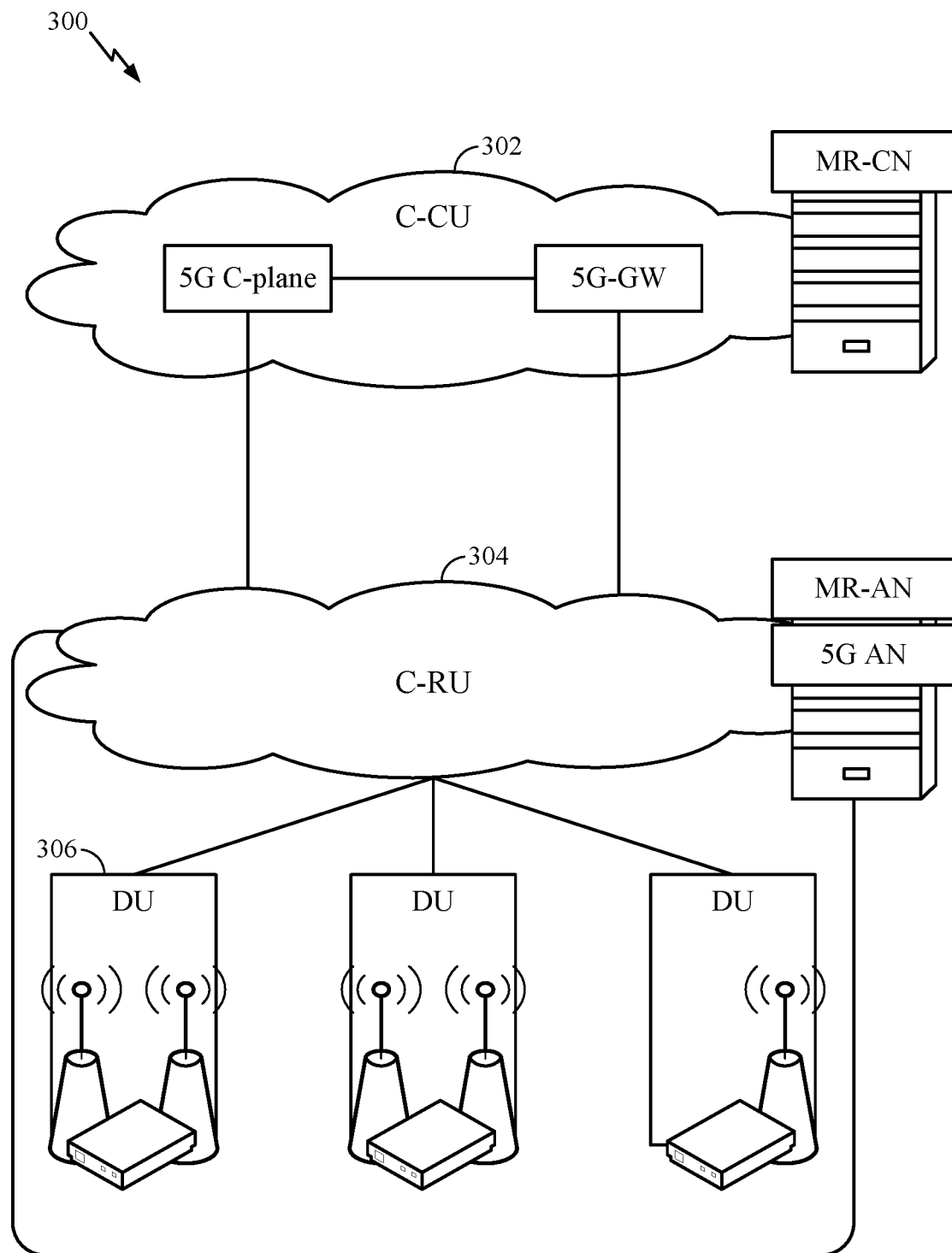
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
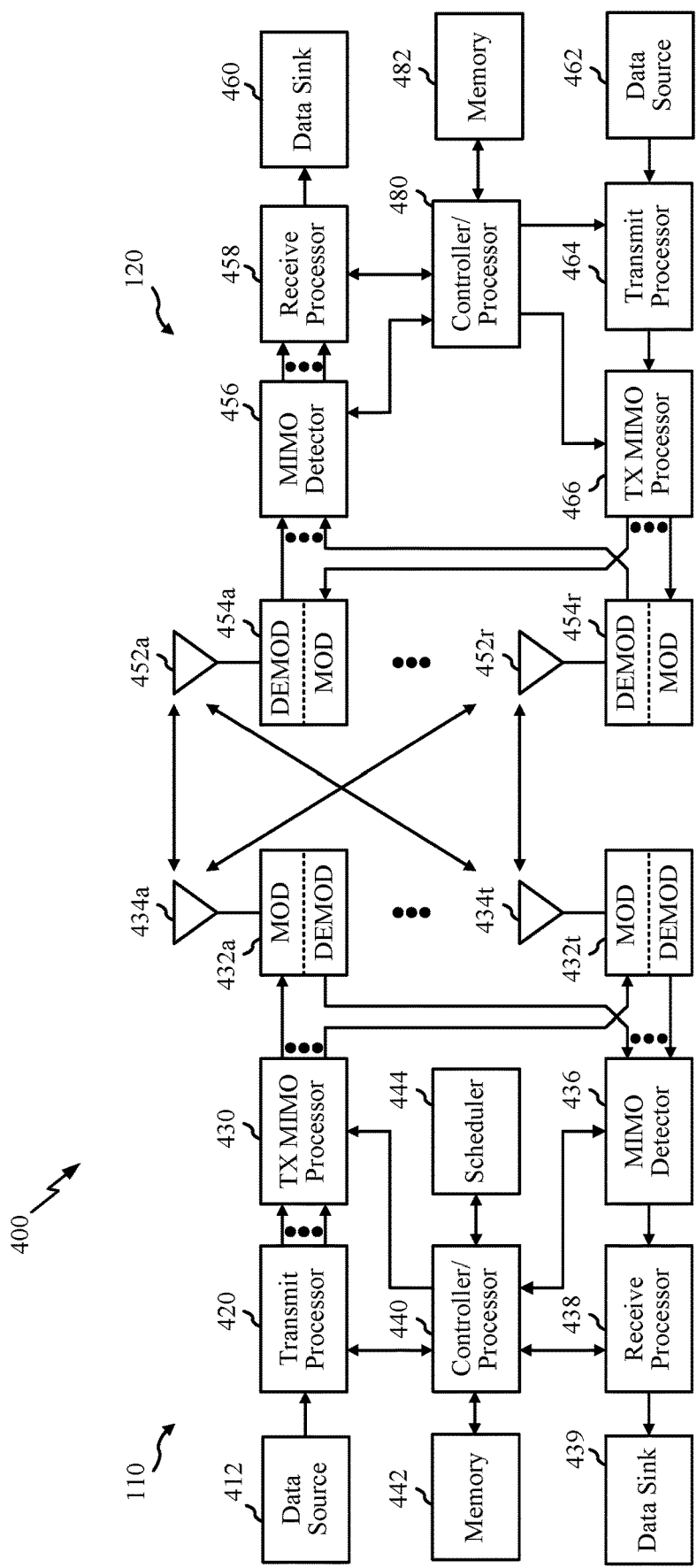
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
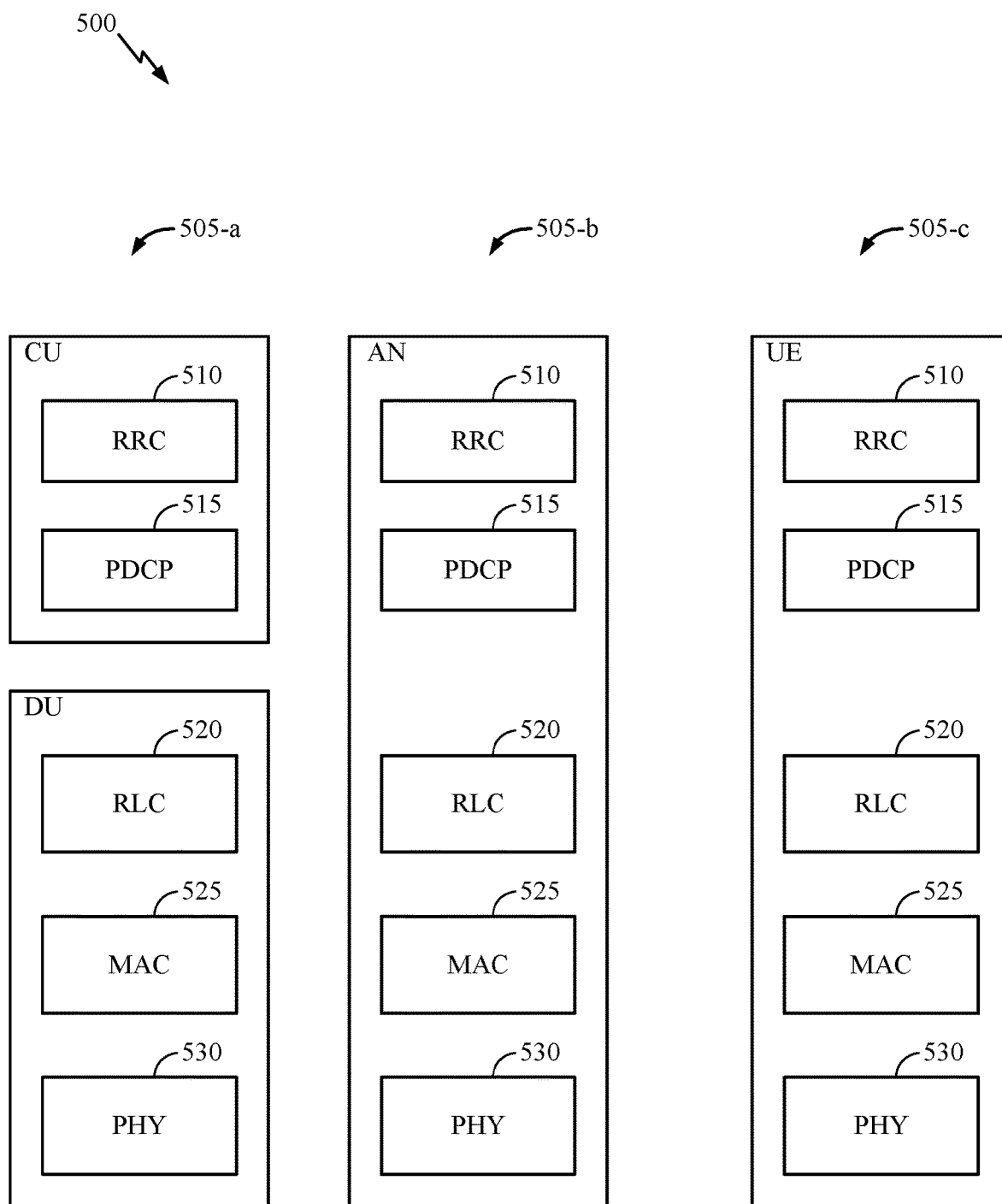
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
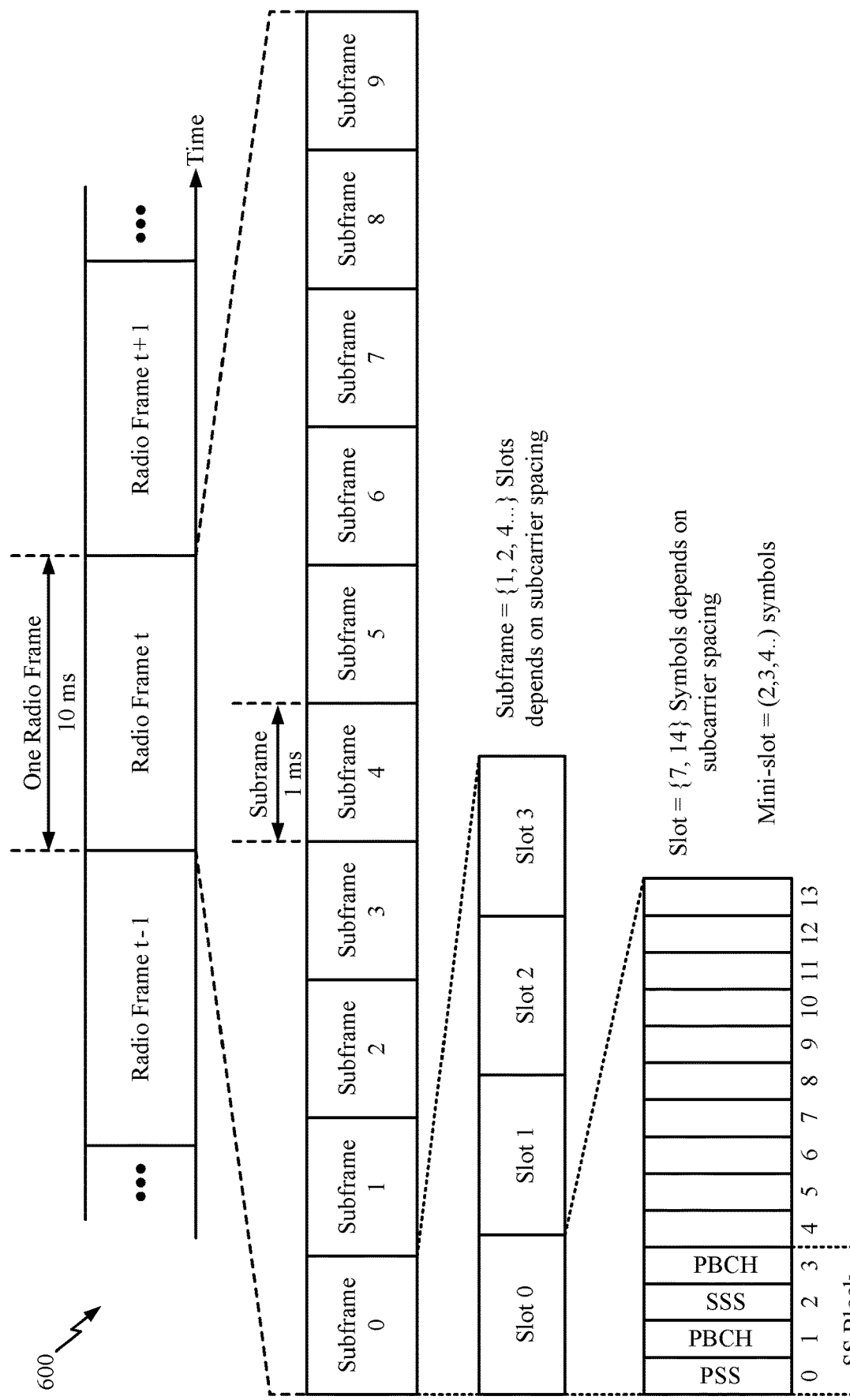
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SRS Resource Configuration Enhancements

In wireless communication systems, such as the wireless communication system described above, user equipments (UEs) may transmit sounding reference signals (SRSs) so that the network/base station (e.g., eNBs, gNB, etc.) can measure uplink channel quality. Typically, one SRS is transmitted by a UE in a last symbol of a subframe. However, more recently, additional symbols have been introduced for transmitting SRSs in a normal uplink (UL) subframe, which may be identified based on a virtual cell ID associated with the UE that transmitted the (additional) SRSs.

Until LTE Release 15, as noted, the last symbol of a normal UL subframe is reserved for SRS transmission. Additionally, there are six uplink pilot time slot (UpPTS) symbols available for SRS transmission in special subframe, but only a maximum of two SRSs may be transmitted in an UpPTS subframe. Additionally, LTE also supports SRS antenna switching (e.g., 1T2R, 1T4R, 2T4R, where T represents the number of transmit antennas and R represents the number of receive antennas), allowing a UE with R antennas more than T SRS tx antenna ports (e.g., R>T) to switch (R/T) antennas or antenna pairs on each SRS transmit instance/opportunity. If frequency hopping is enabled, the SRS antenna switching and subband hopping may be concurrently carried out.

A main objective of introducing additional symbols for SRS transmission is to increase link budget for power-limited UEs (i.e., give more opportunities to UEs to transmit SRS). Further, introducing additional SRS symbols may increase capacity in general (i.e., allow more UEs to transmit SRS, or more antennas from same UE). One straightforward way of extending link budget is by the use of repetitions (e.g., repeating transmission of an SRS), but this has the following issues.

For example, if the repetitions use the whole bandwidth of sounding, then capacity is decreased (and resources wasted). Additionally, for an edge UE with a transmit power limitation, SRS frequency hopping may be used to focus the UE tx power on a smaller narrowband and transmit SRS in different frequency locations in different SRS transmit instances/opportunities so as to perform the sounding over the whole SRS bandwidth. If the repetitions use the narrowband and frequency hopping, the UE may not be able to transmit the SRS over entire SRS bandwidth due to limitations related to time span as well as retuning/power changes. Additionally, if orthogonal cover codes (OCC) are applied on top of SRS (e.g. [++, + −] OCC over SRS repeated symbols) and if one of the symbols is lost (e.g. due to dropping/collision) then it is not possible to demultiplex each UE's SRS at the base station.

Thus, aspects of the present disclosure provide techniques for introducing new SRS resources and parameters to help alleviate the issues described above, while also maintaining backwards compatibility with legacy devices. For example, aspects of the present disclosure provide new SRS resources that may be used to send additional SRSs by non-legacy devices (e.g., in some cases, LTE Rel-16 devices) while still being backwards compatible with legacy devices (e.g., in some cases, LTE Rel-15 and older devices).

Figure 7:
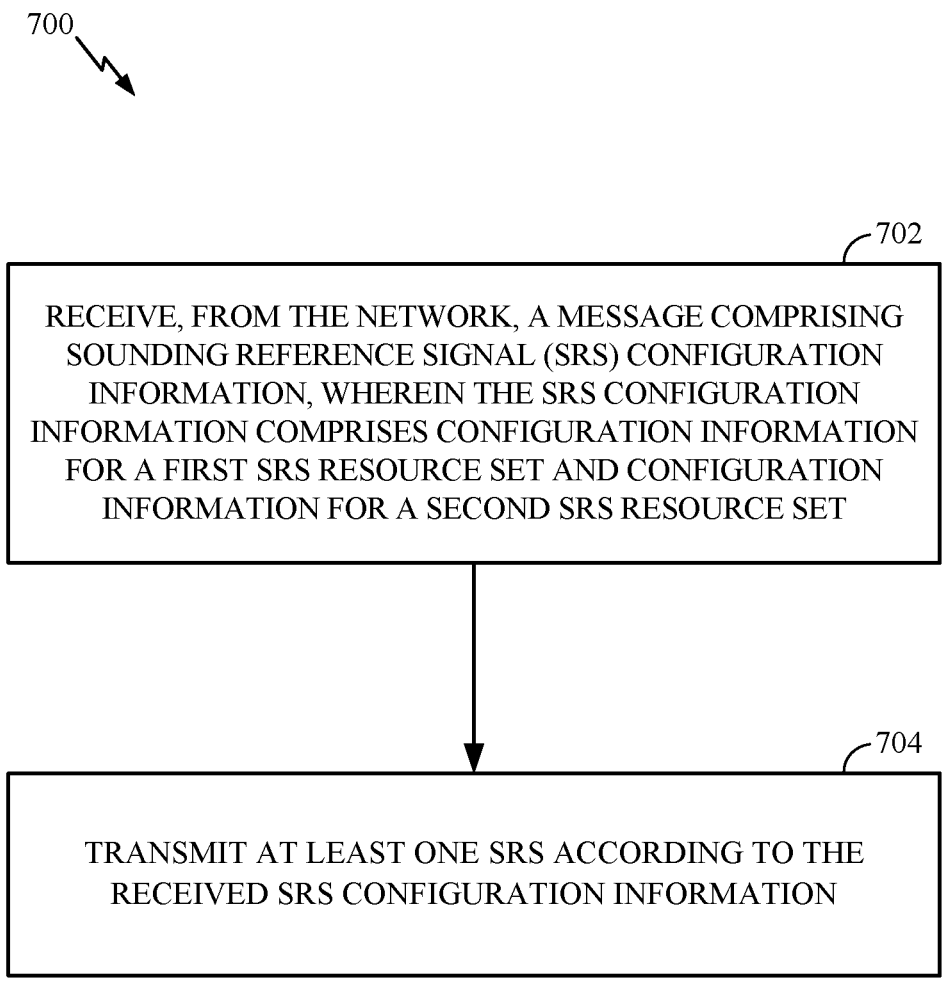
FIG. 7 illustrates example operations for wireless communications by a user equipment, in accordance with certain aspects of the present disclosure.

FIG. 7 illustrates example operations 700 for wireless communications in a network by a user equipment in a network, for example, for transmitting sounding reference signals (SRSs) to the network.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 700 begin at 702 by receiving, from the network, a message comprising sounding reference signal (SRS) configuration information, wherein the SRS configuration information comprises configuration information for a first SRS resource set and configuration information for a second SRS resource set.

At 704, the UE transmits at least one SRS according to the received SRS configuration information.

Figure 8:
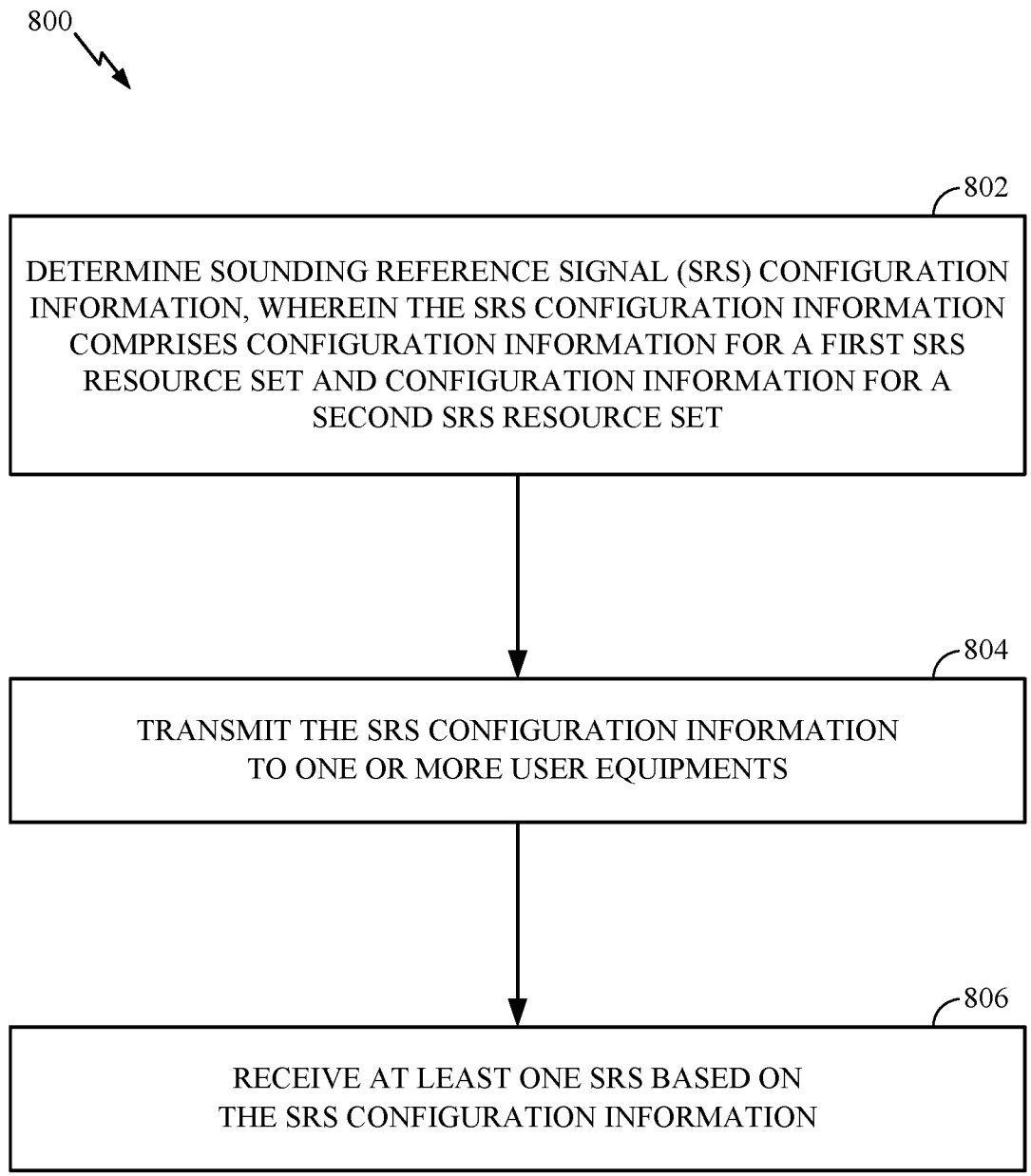
FIG. 8 illustrates example operations for wireless communications by a user equipment, in accordance with certain aspects of the present disclosure.

FIG. 8 illustrates example operations 800 for wireless communications in a network by a base station (BS), for example, for receiving sounding reference signals (SRSs). Operations 800 may be considered complementary to operations 700 performed by the UE.

According to aspects, the BS may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 800 begin at 802 by determining sounding reference signal (SRS) configuration information, wherein the SRS configuration information comprises configuration information for a first SRS resource set and configuration information for a second SRS resource set.

At 804, the BS transmits the SRS configuration information to one or more user equipments.

At 806, the BS receives at least one SRS based on the SRS configuration information.

As noted above, the network may configure different SRS resource sets for use in transmitting SRSs to the network. For example, in some cases, the network may configure a first SRS resource set and a second SRS resource set and transmit SRS configuration information to the UE indicating the first and second SRS resource sets.

According to aspects, the first SRS resource set may be configured similar to that of LTE SRSs such that the first SRS resource set is easy to be multiplexed with legacy UEs, in a similar manner as the legacy UE behavior. For example, the first SRS resource set may indicate (e.g., configure) that an SRS is to be transmitted in a last symbol of a normal UL subframe or that one or (a maximum of) two SRSs are to be transmitted in an UpPTS subframe. However, the first SRS resource set may allow more flexible configuration than legacy SRS. According to aspects, when transmitting an SRS according to the first SRS resource set, the SRS sequence ID may be based on a cell ID or a configured virtual cell ID. Furthermore, the SRS sequence ID may be configured differently, e.g., for the basic SRS (i.e., in the last symbol of normal subframes and the one or two symbols in UpPTS when srs-UpPtsAdd is not enabled) and the additional SRS in UpPTS when srs-UpPtsAdd is enabled. Additionally, in some cases, when transmitting the SRS according to the first SRS resource set, the UE may need to perform power control. In such a case, the power control for the SRS may follow that of a physical uplink shared channel (PUSCH).

According to aspects, the second SRS resource set may be configured to be easy and flexible to multiplex non-legacy UEs (e.g., in some cases, Rel-16+ devices), which are able to transmit additional SRSs (e.g., more than one SRSs in a normal UL subframe or more than two SRSs in a UpPTS subframe). For example, the second SRS resource set may include N symbols per normal UL subframe or UpPTS for SRS transmission. In some cases, N equals 1, 2, 3, 4, 5, or 6 symbols. According to aspects, SRSs transmitted according to the second SRS resource set may be transmitted with an SRS sequence ID based on a cell ID or a configured virtual cell ID. Additionally, power control for SRSs transmitted according to the second SRS resource may be the same or different from that of PUSCH, as described in greater detail below.

According to aspects, the first and second SRS resource sets may be configured by the network periodically/aperiodically, semi-persistently, or periodically with different periodicities and/or offsets. Additionally, in some cases, the network may configure the first SRS resource set and the second SRS resource set such that no SRS symbols overlap between the first SRS resource set and the second SRS resource set. In other cases, the network may configure the first SRS resource set and the second SRS resource set with overlapping SRS symbols, but may provide an explicit or implicit indication of which of the first SRS resource set or the second SRS resource set has priority. In some cases, if no explicit indication is received, the UE may assume the first SRS resource set is prioritized. In other cases, the aperiodic second SRS resource set may be prioritized over a periodic first SRS resource set. According to aspects, the UE may follow the configuration of the prioritized SRS resource set in any overlapped symbols.

Additionally, according to certain aspects, the network may configure SRS resources in the first SRS recourse set and the second SRS resource set on a per-subband and/or per-component carrier basis. For example, in some cases, the network may configure a first SRS resource in the first SRS resource set on a first subband and a second SRS resource in the first SRS resource set on a second subband. Additionally, in some cases, the network may configure a third SRS resource in the second SRS resource set on a first component carrier and a fourth SRS resource in the second SRS resource set on a second component carrier.

In some cases, the first SRS resource set may be configured for UL channel state information (CSI) acquisition. In such a case, when performing open-loop power control, the eNB may consider UL interference to set the power control parameters (e.g., set the target SINR similar as that of PUSCH). Additionally, the open-loop power control parameter, alpha, could be same or different from that of PUSCH. Further, when performing closed-loop power control, the eNB may, in some cases, indicate the same close-loop power control parameters as PUSCH or may use different close-loop power control parameters for SRS and PUSCH, as described in greater detail below.

According to aspects, in some cases, the second SRS resource set may be configured for downlink (DL) CSI acquisition. In such a case, when performing open-loop power control, the eNB/gNB may consider DL interference when setting the power control parameters. For example, the eNB may set the target SINR based on a reported DL CSI/RRM measurement. Additionally, the open-loop power control parameter, alpha, could be same or different from that of PUSCH. Further, when performing closed-loop power control, the eNB may, in some cases, indicate different close-loop power control parameters for SRS from that of PUSCH, as described in greater detail below.

According to aspects, SRS for UL CSI acquisition and DL CSI acquisition may be configured by the network periodically/aperiodically, semi-persistently, or periodically with different periodicities and/or offsets. For example, the network may configure aperiodic SRS for 2×2 UL MIMO and periodic SRS AS 2T4R for DL MIMO for the same UE.

According to aspects, SRS for UL CSI acquisition and DL CSI acquisition may be configured by the network to have different priority when a collision occurs with other uplink channels or even with another SRS. For example, the SRS for DL CSI acquisition may be prioritized for the scheduling of frequently incoming DL traffic transmission. For example, in some cases, if there is a collision between a SRS (e.g., used to schedule a PDSCH) and a PUSCH transmission, the SRS may be prioritized over the PUSCH transmission. Additionally, in some cases, if there is a collision between an SRS (e.g., used to schedule PUSCH) and a PUSCH, the SRS may be de-prioritized.

According to aspects, in some cases, the UE may need to perform power control when transmitting SRSs. Performing power control when transmitting SRSs may include determining a transmission power for transmitting the SRSs under the network control.

For example, in some cases, determining the transmission power may be based on open-loop power control configuration information. More specifically, in certain cases, when open-loop power control for additional SRS symbols (e.g., of the second SRS resource set) is different than that of PUSCH and legacy SRS (e.g., last symbol in a normal uplink subframe), the network may indicate to the UE open-loop power control configuration information/parameters (e.g., via unicast radio resource control (RRC) signaling) separately for the additional SRS symbols. According to aspects, the open-loop power control configuration may apply to additional SRS symbols (e.g., of the second SRS resource set) but not to legacy SRS (e.g., of the first SRS resource set). In some cases, the open-loop power control configuration may apply to both additional SRS symbols and legacy SRS symbols. Further, in some cases, the open-loop power control configuration information may include a power offset relative to the power of legacy SRS, or a power offset relative to the power of PUSCH, to apply to additional SRS symbols.

In some cases, a same closed-loop power control for PUSCH and/or PUCCH may be applied to legacy SRS (e.g., of the first SRS resource set). However, for additional SRS symbols, the network may configure the UE to use the same close-loop power control as legacy SRS or different than that of legacy SRS. For example, in certain cases, when the closed-loop power control is different than that of PUSCH, PUCCH, or legacy SRS, the network may indicate to the UE how and when to perform the closed-loop power control on the SRSs transmitted according to the first SRS resource set.

Additionally, in some cases, determining the transmission power may be based on a downlink control information (DCI) message. For example, in some cases, a group downlink control information (DCI) message (e.g., DCI format 3B) may be used by the network to indicate to the UE to perform closed-loop power control when transmitting SRSs, for example, via a power control command. In some cases, the DCI message may also configure the UE to transmit the SRSs and/or indicate the need for power control. In some cases, the DCI message may trigger, and indicate the need to apply power control command to, additional SRS symbols only but not legacy SRS, or both additional SRS symbols and legacy SRS if both are triggered (e.g., in a PUSCH/PUCCH carrier). According to aspects, in some cases, the PUSCH/PUCCH may not be transmitted in the same subframe where additional SRS is transmitted.

According to aspects, in some cases, the DCI message may trigger additional SRSs and/or legacy SRSs in a PUSCH/PUCCH-less carrier, and may indicate the need to apply same power control command to, the additional SRSs and/or the legacy SRSs. According to aspects, if the DCI message triggers additional SRSs and legacy SRSs in a same subframe (e.g., additional SRSs are limited to use the same UE-specific subframe set as that of aperiodic legacy SRSs), a same power control command may be applied to both additional SRS and legacy SRS. Additionally, according to aspects, if the DCI triggers additional SRSs and legacy SRSs in different subframes (e.g., additional SRSs may use the UE-specific subframe set different than that of aperiodic legacy SRSs), a same power control command may be applied to additional SRSs or legacy SRSs in a respective subframe.

In some cases, the DCI message may be for a DL/UL grant. In this case, since the DCI for the DL/UL grant only includes one power control field and when SRS is triggered by the DCI (e.g., by using an SRS request field), the power control command in the power control field of the DCI message may apply to at least one of PUSCH/PUCCH, legacy SRS, or additional SRS, which may be configurable by the base station/network or predefined for certain cases.

According to aspects, if additional SRSs are not configured, a DCI for DL grant (e.g., DCI format 1A) may trigger legacy SRS and shortened PUCCH in a same subframe (e.g., no PUSCH is triggered) and a DCI for UL grant (e.g., DCI format 0/0A/0B or DCI format 4/4A/4B) may trigger legacy SRS and shortened PUSCH in a same subframe (e.g., no PUCCH is triggered). According to aspects, if additional SRSs are configured and limited to be transmitted in a same subframe as that of aperiodic legacy SRSs, a DCI for DL/UL grant may trigger legacy SRS and additional SRS in a same subframe only (e.g., PUSCH/PUCCH are dropped from being transmitted in the same subframe and possibly transmitted in a different subframe).

According to aspects, if additional SRSs are configured and can be transmitted in a UE-specific subframe different than that of aperiodic legacy SRSs, a DCI for DL/UL grant may trigger legacy SRS plus shortened PUSCH/PUCCH in a same subframe and additional SRS in a different subframe. For example, in some cases, if SRS is triggered by a DCI for DL/UL grant, the power control command in that particular grant may apply to additional SRSs and/or legacy SRSs instead of PUSCH/PUCCH. Alternatively, in some cases, if SRS is triggered by DL/UL DCI, the power control command in the DCI for DL/UL grant may applied to PUSCH/PUCCH, legacy SRS, and additional SRS symbols. In some cases, if SRS is triggered by DL/UL DCI, the power control command in the DCI for DL/UL grant may be applied to PUSCH/PUCCH and legacy SRS only, but not to additional SRS symbols.

Additionally, in some cases, the network may include an additional power control command in DCI for DL/UL grant for performing power control for SRS. In some cases, whether the UE is to perform closed-loop power control when transmitting SRSs may follow the closed-loop parameter (e.g., g(i) specified in Sect. 5.1.2.1 of TS36.213) of the physical uplink control channel (PUCCH), for example, considering the PUCCH responds to the feedback of DL data transmission. In such a case, power control may be limited to the case what the SRS is sent on the CC with PUCCH.

As noted above, the network may configure the second SRS resource set with N subframe symbols for SRS transmission by the UE, where N may equal 1, 2, 3, 4, 5, or 6 symbols. According to aspects, the network may indicate the number of SRS symbols and locations in a subframe in the SRS configuration information transmitted to the UE. For example, in some cases, the network may indicate the number of SRS symbols and location in a subframe using a 14-symbol bitmap within a subframe, a 7-bit bitmap within the predefined half subframe, or a 7-bit bitmap together within the additional 1-bit indicated half subframe. In other cases, the network may include a start offset and consecutive N symbols to be used for SRS transmission using the second SRS resource set in the SRS configuration information.

Additionally, in some cases, the network may select one of a plurality of predefined SRS transmission patterns and provides an indication of which pattern to use in the SRS configuration information. For example, when one SRS needs to be transmitted (e.g., N=1), a first predefined pattern may include transmitting an SRS in a last symbol of a normal subframe (e.g., which may be compatible with legacy devices).

According to aspects, when N=2 and fast switching for SRS is enabled (e.g., 1T2R or 2T4R), a second pattern may include transmitting an SRS in the last two consecutive symbols of a subframe. In some cases, the second pattern may include transmitting an SRS in the last symbol at n-th subframe and transmitting an SRS in the first symbol at (n+1)-th subframe. Alternatively, and SRS may be transmitted in a first symbol and a last symbol of a same subframe. In some cases, the second pattern may include transmitting SRSs according to the following pattern corresponding to symbols: SRS, X, SRS in the last 3-symbols of an sTTI slot, where X is the gap symbol for antenna transit time.

According to aspects, when N=4 and fast switching for SRS is enabled (e.g., 1T4R), a third pattern may include transmitting an SRS in the last four symbols of a subframe, requiring no gap for switching transition time. In some cases, the third pattern may include transmitting SRSs in the last five symbols of a subframe according to the following pattern: SRS, SRS, X, SRS, SRS, keeping a maximum of two consecutive SRS symbols, similar to LTE SRS in UpPTS and also aligning with the last 2-symbol+3-symbol sTTI slots. In some cases, the third pattern may include transmitting SRSs in the last five symbols of a subframe according to the following pattern: SRS, X, SRS, X, SRS, X, SRS in last 7 symbols, requiring 1-symbol gap, X, for switching transition time. In some cases, the third pattern may include transmitting one or two SRSs in the last one or two symbols of subframe n and transmitting 3 or 2 (respectively) SRSs in the first three or two symbols of subframe n+1. Alternatively, it SRS may be transmitted in the first Y (e.g., Y=1, 2 or 3) symbol(s) at the beginning of the subframe and the last (N−Y) symbol(s) in the same subframe.

According to aspects, the SRS transmission patterns described above may be configurable based on the UE capability for switching transition time and sTTI configuration. Additionally, after receiving an indication of the SRS transmission pattern in the SRS configuration information, the UE may transmit one or more SRSs in accordance with the received transmission pattern.

Figure 9:
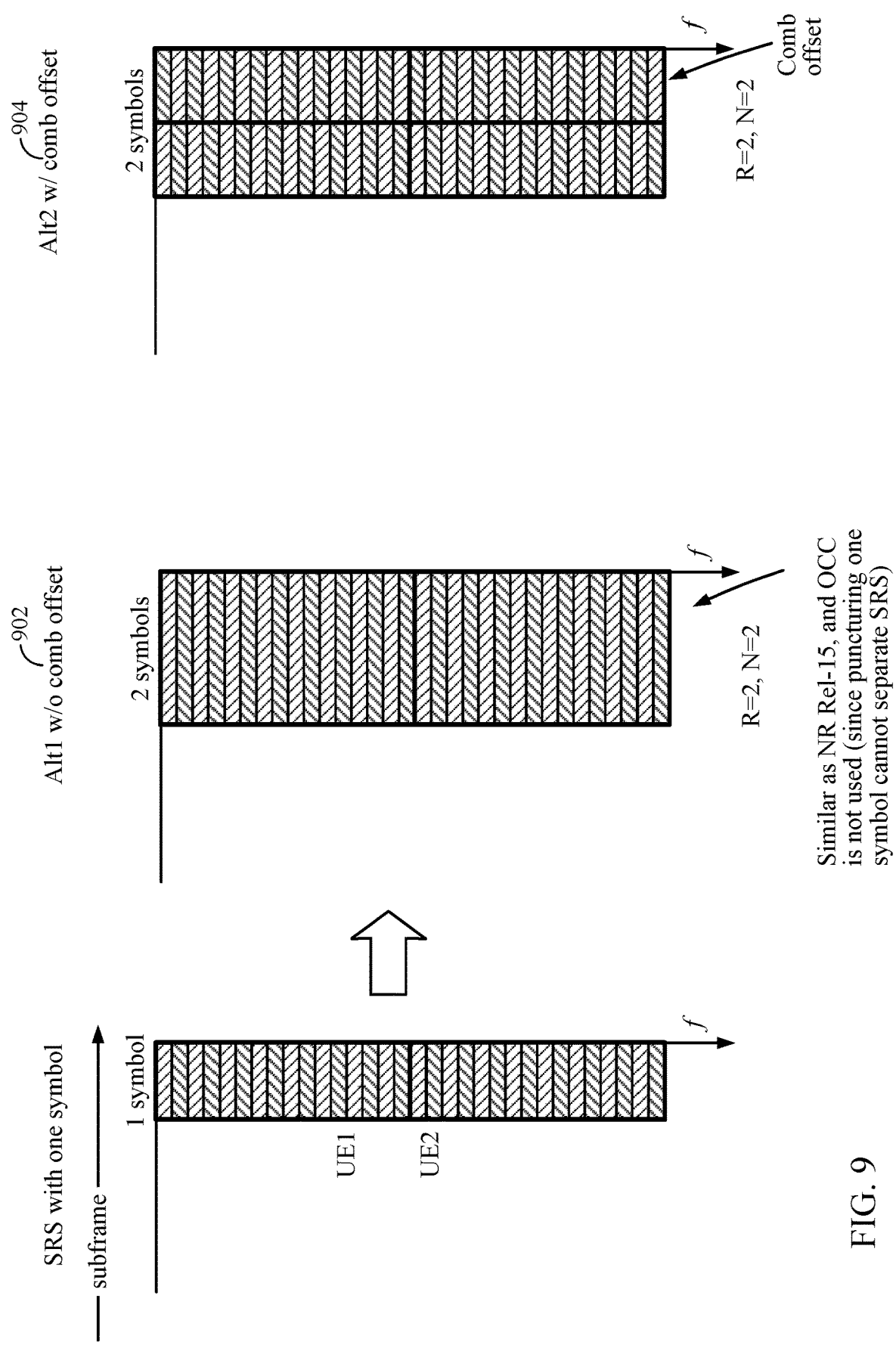
FIG. 9 illustrates example sounding reference signal (SRS) transmissions with comb offset, in accordance with certain aspects of the present disclosure.

According to aspects, in some cases, to improve and extend link budget, SRSs transmitted according to the second SRS resources set may be repeated R-times with a comb offset, for example, as illustrated in FIG. 9. For example, in some cases, as illustrated at 902, transmission of an SRS symbol by the UE may be configured to repeat R times (e.g., R=2 or 4) with same comb/comb offset/CS/subband/port. In other cases, as illustrated at 904, transmission of an SRS symbol by the UE may be configured to repeat R times (e.g., R=2 or 4) with same comb/CS/subband/port but different comb offset for channel estimation improvement.

Figure 10:
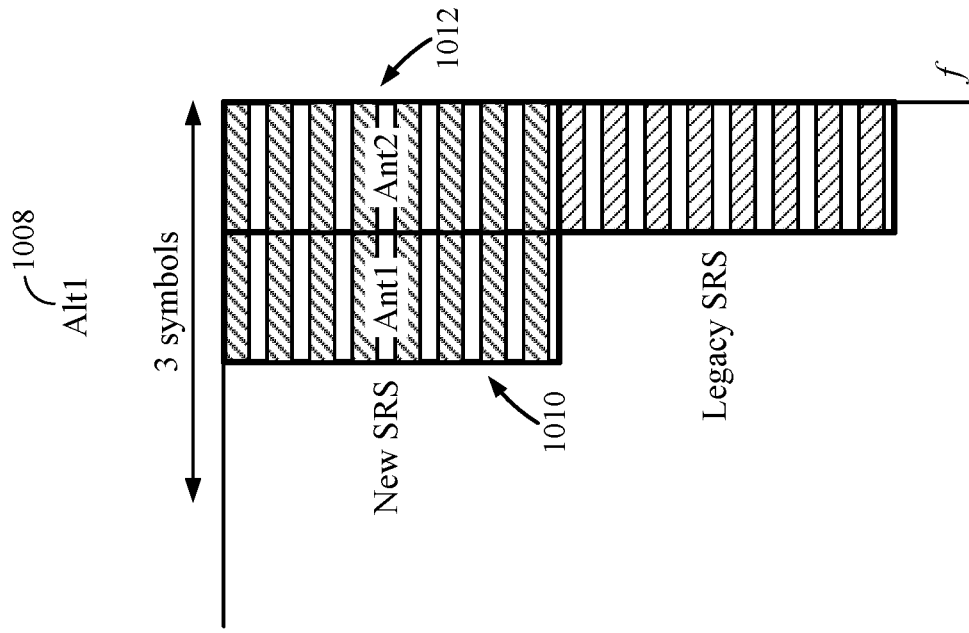
FIG. 10 illustrates example sounding reference signal (SRS) transmissions using antenna switching and frequency hopping, in accordance with certain aspects of the present disclosure.
Figure 10:
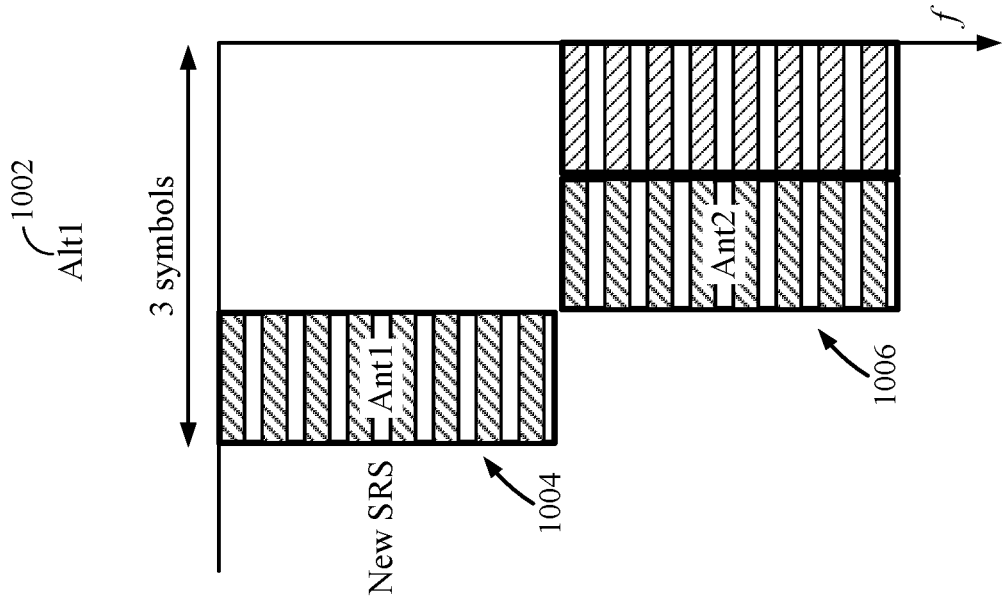

In some cases, SRS antenna switching with a configurable subband may be used by the UE when transmitting SRSs according to the second SRS resources set, as illustrated in FIG. 10. For example, in a first case as shown at 1002 in FIG. 10, if R<N, antenna switching and subband hopping may be performed concurrently by the UE (e.g., if TDM with legacy SRS). For example, as illustrated in FIG. 10, the UE may transmit a first SRS on a first subband 1004 using a first antenna and transmit a second SRS on a second subband 1006 using a second antenna.

Additionally, in a second case as shown at 1008 in FIG. 10, the UE may perform antenna switching on same subband within a subframe or within a slot when transmitting an SRS. For example, as illustrated in FIG. 10, the UE may transmit a first SRS on a first subband using a first antenna at 1010 and transmit a second SRS on the first subband using a second antenna at 1012. Note that the SRS antenna switching over the different subbands or the same subband may be configured by eNB for different scenarios. For example, when both non-legacy UE and legacy UE use frequency hopping, the non-legacy UE need to be allocated a different frequency subband in the last SRS symbol of the normal subframe to avoid the collision. The non-legacy UE with more than one symbol is configured to switch antennas over the same subband within the same subframe as legacy UE.

The subband hopping may be carried out subframe by subframe, similar as that of legacy UE with only one SRS symbol per subframe.

In some cases, to gain link budget and fast sounding, the network/eNB may configure up to N SRS symbols in the same subframe (e.g., N=6 (1 slot except last symbol)). According to aspects, in some cases, when having different SRS configurations (e.g. different subbands, antennas, power control) that create power/antenna changes, it may be beneficial to sound in multiple dimensions. However, sounding in multiple dimensions introduces the problem of dropping part of the SRS symbol due to retuning/antenna switching.

Figure 11:
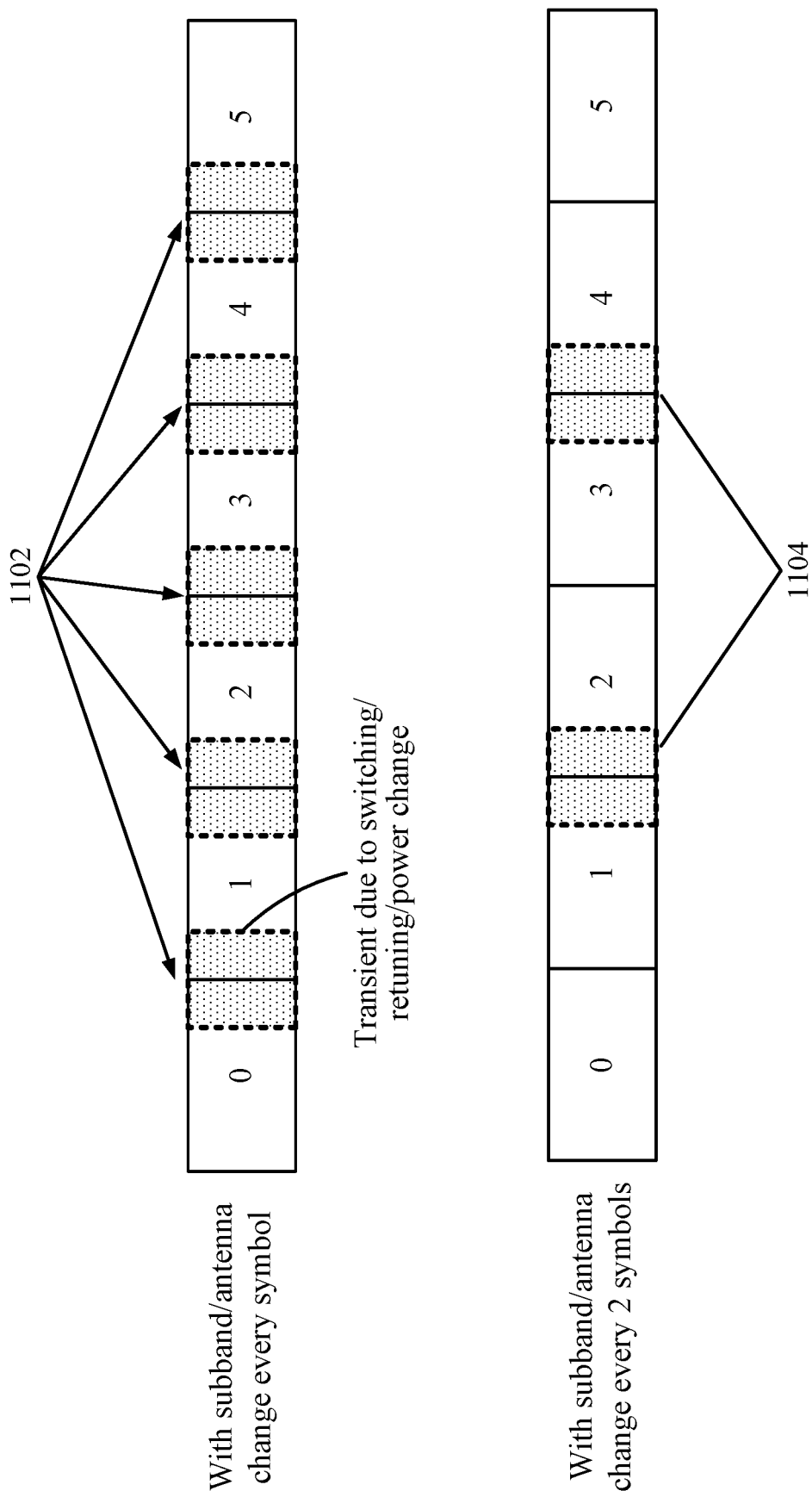
FIG. 11 illustrates example sounding reference signal (SRS) transmissions with a reduced number of subband and antenna changes, in accordance with certain aspects of the present disclosure.

Thus, aspects of the present disclosure propose techniques to help alleviate the issue of dropping parts of SRS when returning/antenna switching by limiting the number of subband changes/antenna changes/power changes in consecutive SRS symbols, as illustrated in FIG. 11. For example, if N=6 symbols, aspects of the present disclosure propose to allow for only 3 different subbands/antennas/power changes (example can be extended to other number of different subband/antennas) (e.g., may be dependent on UE capability). For example, the network may configure 6 SRS symbols (N=6), but SRSs in symbols {0,1}, {2,3}, {4,5} are in the same subband/antenna/power (comb may change as described in previous slide, since it doesn't trigger any power change). Thus, as illustrated in FIG. 11, instead of switching antennas and retuning five times as seen at 1102, by scheduling SRSs {0,1}, {2,3}, {4,5} in the same subband/antenna/power, the number of antenna switches/retunes is reduced to two as seen at 1104, thereby reducing the portions of SRSs that are dropped. Thus, the network (e.g., bases station) and/or UE may determine a transmission pattern to reduce at least one of a number of antenna switches, subband switches, or power changes when transmitting a plurality of SRSs, wherein transmitting at least one SRS is performed based, at least in part, on the determined transmission pattern.

According to aspects, in Rel-15 LTE, a cell ID may be used as an SRS sequence ID to set group/sequence hopping (u, v) for a Zadoff-Chu (ZC) sequence root, varying subframe-by-subframe. In Rel-16 NR, a UE-specific ID may be used as an SRS sequence ID for ZC roots for all SRS symbols per UE, varying symbol-by-symbol.

Aspects of the present disclosure provide a symbol/symbol group-specific SRS ID configuration for LTE Rel-16. For example, SRSs transmitted in the last symbol of a normal subframe may use cell ID for the SRS sequence ID, while additional SRS symbols (e.g., not the last symbol of the normal subframe) may use a configured virtual cell ID. In another example of SRS in UpPTS, the SRS sequence ID for the one or two SRS (available even when srs-UpPtsAdd is not enabled) and the additional two or four SRS symbols in UpPTS (when srs-UpPtsAdd is enabled) can be configured differently.

According to aspects, if using SRS sequence ID $n_{ID}^{RS}$, which could be cell ID or configured virtual cell ID, the SRS sequence may use the sequence group number u and number v within a group to set the ZC sequence root as $q = \lfloor N_{ZC}^{RS}(u+1)/31 + 1/2 \rfloor + v(-1)^{\lfloor 2N_{ZC}^{RS}(u+1)/31 \rfloor}$, varying symbol-by-symbol.

According to aspects, the sequence group number u in slot $n_s$ may be defined as $u = (f_{gh}(l_0+l', n_s) + n_{ID}^{RS}) \mod 30$, where $f_{gh}(l', n_s)$ is the group hopping pattern, given by $$f_{gh}(l', n_s) = \begin{cases} \left(\sum_{i=0}^{7} (c(8(l_0 + l' + n_s \cdot N_{symb}^{slot})) + i) \cdot 2^i\right) \mod 30 \\ 0 \end{cases}$$

if group hopping is enabled, if group hopping is disabled where $l_0+l'+n_s \cdot N_{symb}^{slot}$ is the index of the starting SRS symbol with $N_{symb}^{slot}$ as the symbol number per slot and c(i) is the pseudo-random sequence defined by clause 7.2 of TS36.211. The pseudo-random sequence generator shall be initialized with $c_{init} = n_{ID}^{RS}$, or alternatively with $$c_{init} = \left\lfloor \frac{n_{ID}^{RS}}{30} \right\rfloor$$

at the beginning of each radio frame. Two types of $c_{init}$ for the group number u may be useful for different scenarios, e.g., $$c_{init} = \left\lfloor \frac{n_{ID}^{RS}}{30} \right\rfloor$$

works in a similar way as the legacy SRS with cell ID with good network planning to avoid collision for $n_{ID}^{RS}=0\sim29$; while, $c_{init}=n_{ID}^{RS}$ could have more SRS randomization of different UEs. The network may explicitly (e.g., by using RRC signaling or system information) or implicitly indicate which type of $c_{init}$ is used for SRS group hopping.

Additionally, according to aspects, the base sequence number v within the base sequence group in slot $n_s$ may be defined as $$v = \begin{cases} (c(l_0 + l' + n_s \cdot N_{symb}^{slot}) \\ 0 \end{cases}$$

if sequence hopping is enabled and grop hopping is disabled otherwise The parameter Sequence-hopping-enabled provided by higher layers determines if sequence hopping is enabled or not. c(i) is the pseudo-random sequence defined by clause 7.2 of TS36.211. The pseudo-random sequence generator may be initialized with $c_{init}=n_{ID}^{RS}$, or alternatively $$c_{init} = \left\lfloor \frac{n_{ID}^{RS}}{30} \right\rfloor \cdot 2^5 + (n_{ID}^{RS} + \Delta_{ss}) \mod 30,$$

at the beginning of each radio frame, where $\Delta_{ss}$ could be 0 or $\Delta_{ss} \in \{0,1, \ldots 29\}$ configured by higher layers if cell ID is used as $n_{ID}^{RS}$. Two types of $c_{init}$ for the sequence number v may be useful for different scenarios. The network may explicitly (e.g., by using RRC signaling or system information) or implicitly indicate which type of $c_{init}$ is used for SRS sequence hopping.

According to aspects, aspects provide different ways to further increase the number of non-orthogonal/orthogonal SRS sequences for UE multiplexing. For example, for a non-orthogonal way, additional symbol-specific ZC root offset over the configured R (e.g., R=2 or 4) repeated symbols may be added if both group hopping and sequence hopping are disabled, so that the SRS sequences over the R symbols are different ZC sequences with varied roots. Further, for example, for an orthogonal way, UE-group-specific comb offset/cyclic shift offset hopping over configured R (e.g., R=2 or 4) repeated symbols per slot may be added. Thus, in some cases, the UE may determine an SRS sequence with symbol-specific root configuration if group hopping or sequence hopping is enabled and determining at least one of a root based on (u, v). In some cases, the UE may determine an SRS sequence with additional ZC root offset, comb offset or cyclic shift offset configuration if both group hopping and sequence hopping are disabled.

Figure 12:
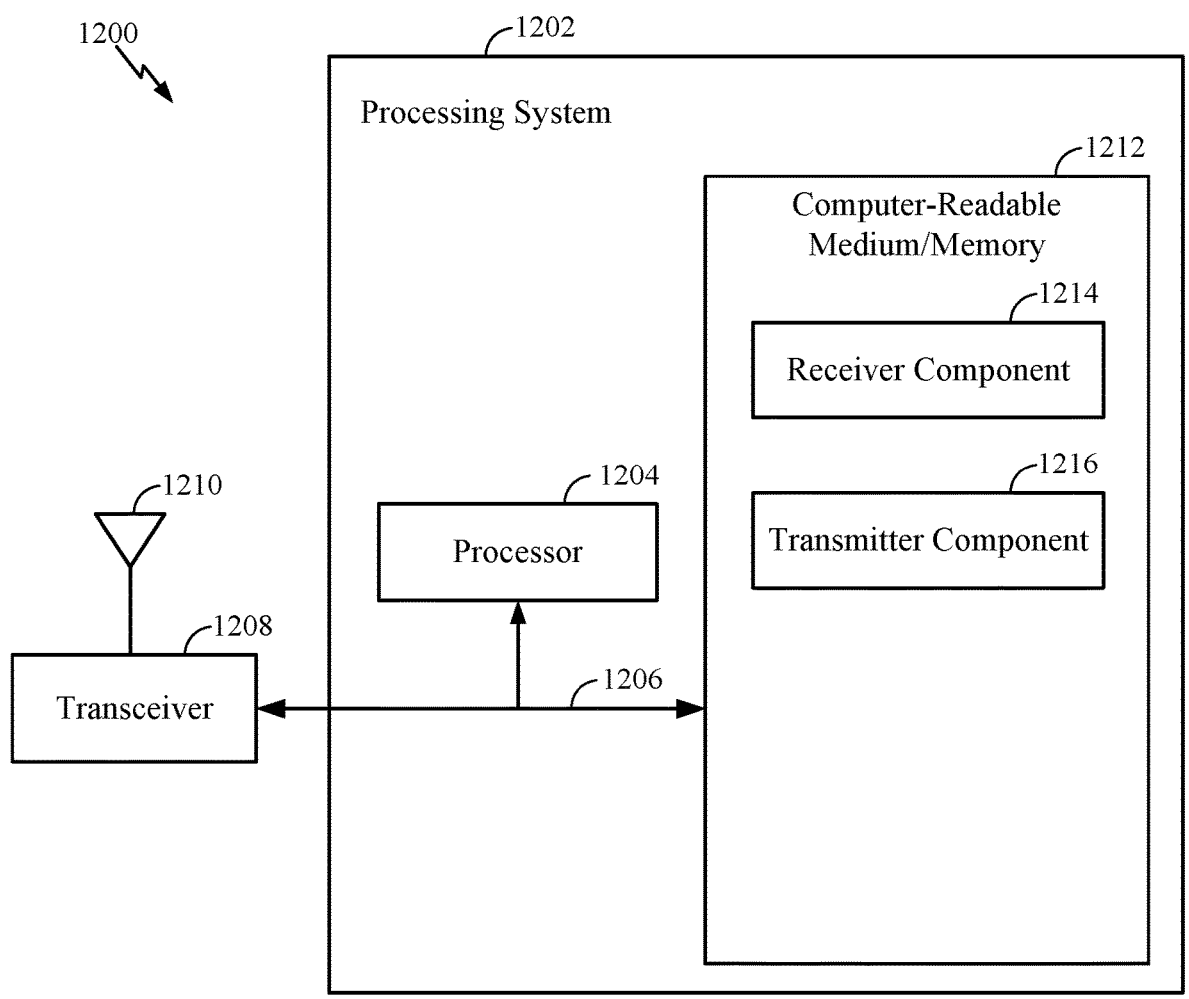
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions that when executed by processor 1204, cause the processor 1204 to perform the operations illustrated in FIG. 7, or other operations for performing the various techniques discussed herein.

In certain aspects, the processor system 1202 further includes a receiver component 1214 for performing the operations illustrated in FIG. 7 at 702. Additionally, the processing system 1202 includes a transmitter component 1216 for performing the operations illustrated in FIG. 7 at 704. The receiver component 1214 and the transmitter component 1216 may be coupled to the processor 1204 via bus 1206. In certain aspects, the receiver component 1214 and the transmitter component 1216 may be hardware circuits. In certain aspects, the receiver component 1214 and the transmitter component 1216 may be software components that are executed and run on processor 1204. The processing system 1202 may also include other components (e.g., hardware and/or software) not shown in FIG. 12 that configured to perform techniques presented herein. For example, in some cases, the processing system 1202 may include a determining component configured to perform techniques presented herein.

Figure 13:
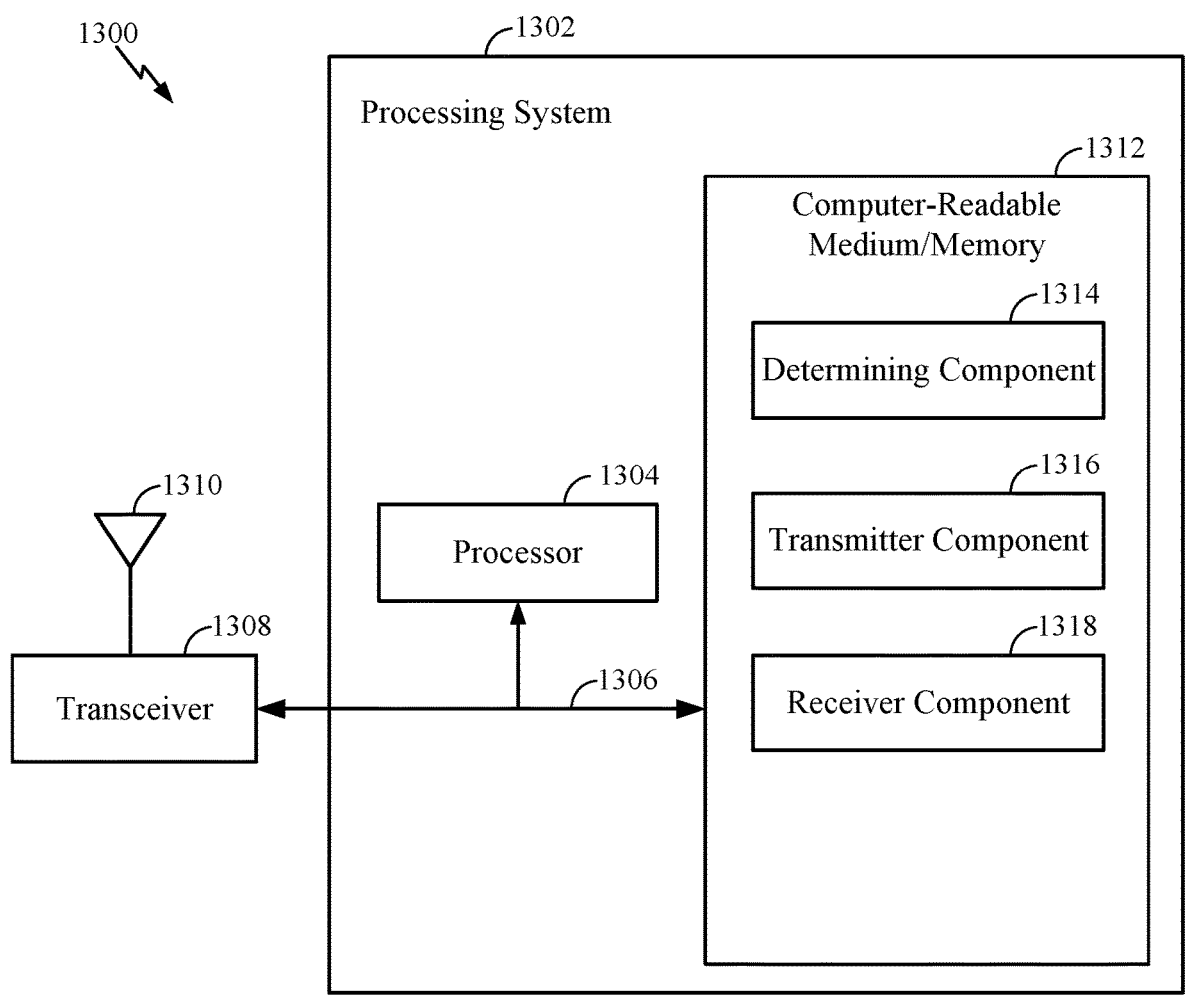
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 8. The communications device 1300 includes a processing system 1302 coupled to a transceiver 1308. The transceiver 1308 is configured to transmit and receive signals for the communications device 1300 via an antenna 1310, such as the various signal described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions that when executed by processor 1304, cause the processor 1304 to perform the operations illustrated in FIG. 8, or other operations for performing the various techniques discussed herein.

In certain aspects, the processor system 1302 further includes a determining component 1314 for performing the operations illustrated in FIG. 8 at 802. Additionally, the processing system 1302 includes a transmitter component 1316 for performing the operations illustrated in FIG. 8 at 804. Additionally, the processing system 1302 includes a receiver component 1318 for performing the operations illustrated in FIG. 8 at 806. The determining component 1314, transmitter component 1316, and receiver component 1318 may be coupled to the processor 1304 via bus 1306. In certain aspects, the determining component 1314, transmitter component 1316, and receiver component 1318 may be hardware circuits. In certain aspects, the determining component 1314, transmitter component 1316, and receiver component 1318 may be software components that are executed and run on processor 1304.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications in a network by a user equipment (UE), comprising:
   receiving, from the network, a message comprising sounding reference signal (SRS) configuration information, wherein the SRS configuration information comprises a first configuration information for a first SRS resource set and a second configuration information for a second SRS resource set, wherein the first SRS resource set and the second SRS resource set indicate time and frequency resources to be used for SRS transmission, wherein the first SRS resource set is configured to be backwards compatible with legacy UEs and the second SRS resource set is configured to be compatible with non-legacy UEs; and
   transmitting at least one SRS according to the received SRS configuration information.

2. The method of claim 1, wherein the at least one SRS transmitted according to at least one of the first SRS resource set or the second SRS resource set include an SRS sequence ID, wherein the SRS sequence ID comprises one of a cell ID or a configured virtual cell ID.

3. The method of claim 1, wherein at least one of the first SRS resource set or the second SRS resource set are configured periodically, aperiodically, semi-persistently or periodically with at least one of a different periodicity or a different offset.

4. The method of claim 1, wherein the first SRS resource set and the second SRS resource set do not comprise overlapped SRS symbols.

5. The method of claim 1, wherein transmitting the at least one SRS according to the received SRS configuration information comprises:
   determining a transmission power for transmitting the at least one SRS according to the received SRS configuration information.

6. The method of claim 5, wherein the determining is based on a power control command received in a downlink control information (DCI) message from the network, wherein one of:
   the DCI message comprises a group DCI message; or
   the DCI message is for a downlink (DL) grant or an uplink (UL) grant.

7. The method of claim 6, wherein the DCI message indicates that the power control command is to be applied to one of:
   additional SRS symbols of the second SRS resource set but not legacy SRS symbols of the first SRS resource set;
   legacy SRS symbols of the first SRS resource set but not to additional SRS symbols of the second SRS resource set; or
   both additional SRS symbols of the second SRS resource set and legacy SRS symbols of the first SRS resource set.

8. The method of claim 5, wherein the determining is based on open-loop power control configuration information received in unicast radio resource control (RRC) signaling, applying to one of:
   additional SRS symbols of the second SRS resource set but not to legacy SRS of the first SRS resource set; or
   legacy SRS of the first SRS resource set but not to additional SRS symbols of the second SRS resource set; or
   both additional SRS symbols of the second SRS resource set and legacy SRS symbols of the first SRS resource set; or
   both additional SRS symbols of the second SRS resource set and legacy SRS symbols of the first SRS resource set with a power offset configuration information between additional SRS symbols of the second SRS resource set and legacy SRS symbols of the first SRS resource set.

9. The method of claim 1, wherein the at least one of the first SRS resource set or the second SRS resource set configures an SRS for transmission in each of N symbols of a normal uplink (UL) subframe or an uplink pilot time slot (UpPTS) subframe, wherein the SRS configuration information comprises one of:
   a bitmap indicating locations of the N symbols to transmit an SRS in a subframe or a slot; or
   a start offset and N consecutive symbols to transmit an SRS; or
   an indication of one of a plurality of pre-defined SRS transmission patterns based on N and the plurality of pre-defined SRS transmission patterns are configurable based on a capability of the UE for at least one of switching transition time, power changes, or sTTI configuration.

10. The method of claim 1, further comprising repeating transmission of the at least one SRS R times with one of:
    a same comb, comb offset, cyclic shift, subband, and port as a previous transmission of the at least one SRS;
    a different comb offset in a symbol from a previous transmission of the at least one SRS; or
    using R-time subband frequency hopping with same or different comb offsets.

11. The method of claim 1, wherein transmitting the at least one SRS comprises transmitting the at least one SRS according to a configurable frequency hopping or antenna switching transmission pattern, wherein the transmission pattern comprises one of:
    transmitting a first SRS on a first subband using a first antenna; and
    transmitting a second SRS on a second subband using a second antenna; or
    transmitting a first SRS on a first subband using a first antenna; and transmitting a second SRS on the first subband using a second antenna; or transmitting a first SRS on a first subband using a first antenna; and transmitting a second SRS on the second subband using a first antenna.

12. The method of claim 1, further comprising:

determining a transmission pattern to reduce at least one of a number of antenna switches, subband switches, or power changes when transmitting a plurality of SRSs, wherein transmitting at least one SRS is performed based, at least in part, on the determined transmission pattern.

13. The method of claim 1, further comprising at least one of:

determining an SRS sequence with symbol-specific configuration if group or sequence hopping is enabled; and determining at least one of a root offset, comb offset or cyclic shift offset configuration if group and sequence hopping is disabled.

14. A method of wireless communications in a network by a base station (BS), comprising:

determining sounding reference signal (SRS) configuration information, wherein the SRS configuration information comprises a first configuration information for a first SRS resource set and a second configuration information for a second SRS resource set, wherein the first SRS resource set and the second SRS resource set indicate time and frequency resources to be used for SRS transmission, wherein the first SRS resource set is configured to be backwards compatible with legacy UEs and the second SRS resource set is configured to be compatible with non-legacy UEs;

transmitting the SRS configuration information to one or more user equipments; and receiving at least one SRS based on the SRS configuration information.

15. The method of claim 14, wherein the at least one SRS transmitted according to at least one of the first SRS resource set or the second SRS resource set include an SRS sequence ID, wherein the SRS sequence ID comprises one of a cell ID or a configured virtual cell ID.

16. The method of claim 14, wherein at least one of the first SRS resource set or the second SRS resource set are configured periodically, aperiodically, semi-persistently or periodically with at least one of a different periodicity or a different offset.

17. The method of claim 14, wherein the first SRS resource set and the second SRS resource set do not comprise overlapped SRS symbols.

18. The method of claim 14, further comprising:

determining that power control needs to be performed on SRS transmissions; and transmitting a power control command to the one or more user equipments, instructing the UEs to perform the power control on SRS transmissions, wherein:

the power control command is transmitted in a downlink control information (DCI) message; and one of:

the DCI message comprises a group DCI message; or the DCI message is for a downlink (DL) grant or an uplink (UL) grant.

19. The method of claim 18, the DCI message indicates that the power control command is to be applied to one of:

additional SRS symbols of the second SRS resource set but not legacy SRS symbols of the first SRS resource set;

legacy SRS symbols of the first SRS resource set but not to additional SRS symbols of the second SRS resource set; or both additional SRS symbols of the second SRS resource set and legacy SRS symbols of the first SRS resource set.

20. The method of claim 18, further comprising transmitting open-loop power control configuration information based on the determination that power control needs to be performed on the SRS transmissions, wherein the open-loop power control configuration information is transmitted in unicast radio resource control (RRC) signaling, and wherein the open-loop power control configuration applies to one of:

additional SRS symbols of the second SRS resource set but not to legacy SRS of the first SRS resource set; or legacy SRS of the first SRS resource set but not to additional SRS symbols of the second SRS resource set; or both additional SRS symbols of the second SRS resource set and legacy SRS symbols of the first SRS resource set; or both additional SRS symbols of the second SRS resource set and legacy SRS symbols of the first SRS resource set with a power offset configuration information between additional SRS symbols of the second SRS resource set and legacy SRS symbols of the first SRS resource set.

21. The method of claim 14, wherein the at least one of the first SRS resource set or the second SRS resource set configures an SRS for transmission in each of N symbols of a normal uplink (UL) subframe or an uplink pilot time slot (UpPTS) subframe, wherein the SRS configuration information comprises one of:

a bitmap indicating locations of the N symbols to transmit an SRS in a subframe or a slot;

a start offset and N consecutive symbols to transmit an SRS; or an indication of one of a plurality of pre-defined SRS transmission patterns based on N and the plurality of pre-defined SRS transmission patterns are configurable based on a capability of the UE for at least one of switching transition time or sTTI configuration.

22. The method of claim 14, further comprising receiving one or more repeated SRS transmissions with one of:

a same comb, comb offset, cyclic shift, subband, and port as a previous transmission of the at least one SRS;

a different comb offset in a symbol from a previous transmission of the at least one SRS; or using R-time subband frequency hopping with same or different comb offsets.

23. The method of claim 14, wherein receiving the at least one SRS comprises:

receiving a first SRS on a first subband using a first antenna; and receiving a second SRS on a second subband using a second antenna.

24. The method of claim 14, wherein receiving the at least one SRS comprises:

receiving a first SRS on a first subband using a first antenna; and receiving a second SRS on the first subband using a second antenna.

25. The method of claim 14, further comprising:
determining a transmission pattern to reduce at least one of a number of antenna switches, subband switches, or power changes when transmitting a plurality of SRSs, wherein the SRS configuration information includes an indication of the determined transmission pattern.

26. The method of claim 25, wherein receiving the at least one SRS is based on the transmission pattern.

27. An apparatus for wireless communications in a network by a user equipment (UE), comprising:
at least one processor configured to:
receive, from the network, a message comprising sounding reference signal (SRS) configuration information, wherein the SRS configuration information comprises a first configuration information for a first SRS resource set and a second configuration information for a second SRS resource set, wherein the first SRS resource set and the second SRS resource set indicate time and frequency resources to be used for SRS transmission, wherein the first SRS resource set is configured to be backwards compatible with legacy UEs and the second SRS resource set is configured to be compatible with non-legacy UEs; and
transmit at least one SRS according to the received SRS configuration information; and
a memory coupled with the at least one processor.

28. An apparatus for wireless communications in a network by a base station (BS), comprising:
at least one processor configured to:
determine sounding reference signal (SRS) configuration information, wherein the SRS configuration information comprises a first configuration information for a first SRS resource set and a second configuration information for a second SRS resource set, wherein the first SRS resource set and the second SRS resource set indicate time and frequency resources to be used for SRS transmission, wherein the first SRS resource set is configured to be backwards compatible with legacy UEs and the second SRS resource set is configured to be compatible with non-legacy UEs;
transmit the SRS configuration information to one or more user equipments; and
receive at least one SRS based on the SRS configuration information; and
a memory coupled with the at least one processor.

* * * * *